Jan. 5, 1960 L. J. FOGEL 2,920,138

SYSTEM FOR IMPROVING INTELLIGIBILITY

Filed Feb. 19, 1957

INVENTOR,
LAWRENCE J. FOGEL.

BY Harry M. Saragovitz
ATTORNEY.

2,920,138
Patented Jan. 5, 1960

2,920,138

SYSTEM FOR IMPROVING INTELLIGIBILITY

Lawrence J. Fogel, San Diego, Calif.

Application February 19, 1957, Serial No. 641,231
5 Claims. (Cl. 179—1)
(Granted under Title 35, U.S. Code (1952), sec. 266)

The invention described herein may be manufactured and used by or for the Government for governmental purposes, without the payment of any royalty thereon.

This invention relates to binaural phenomena and more particularly to devices for producing various binaural phenomena for better intelligibility of sound.

The prior art teaches that binaural techniques create the illusion of depth or of direction to a source of sound and that there is a psycho-acoustical phenomenon that renders sound from a particular direction more intelligible than random sound, especially in the presence of other distracting sounds or noise. This technique has been utilized to some extent in the reproduction of audible signals where the signal to noise ratio is unavoidably low. However, no attempt has been made to provide a means for receiving two or more audible signals simultaneously.

It is, therefore, an object of this invention to provide an improved binaural signal receiving system. It is a further object of this invention to provide an improved system for the distinguishing of sounds from multiple sources by creating the illusion of separate spatial localization of each source.

In this invention a single headset with dual earphones is made to receive a plurality of signals each having a separate phase relation with respect to the two earphones so that each of the sounds appears to have a separate and distinct spatial position.

Figure 1:
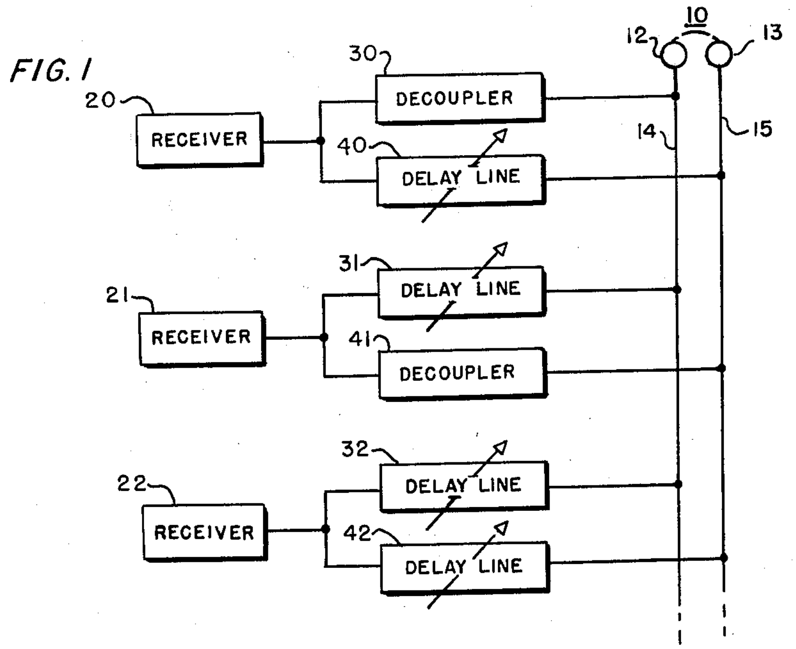
Figure 2:
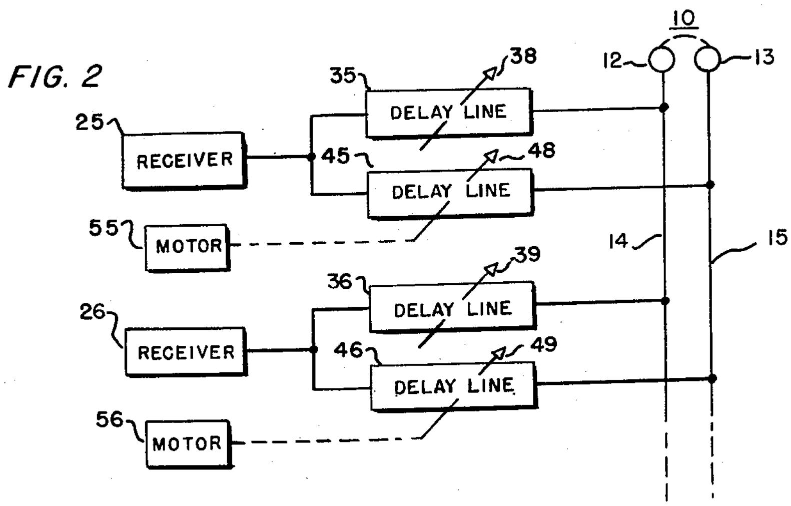

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Fig. 1 shows a first embodiment of this invention having three or more receivers connected through time delay networks to binaural earphones; and Fig. 2 shows the receivers connected through continuously variable time delay networks to the binaural earphones.

Referring now particularly to Fig. 1, the binaural headset 10 has earphones 12 and 13 with corresponding connecting leads 14 and 15. The receivers 20, 21 and 22 are connected through time delay networks to the binaural earphone leads.

The receivers 20—22 may be radio receiving sets or other electronic apparatus for receiving and translating energy into alternating current of audible frequencies. The output of each receiver is divided into two channels of which one or both channels may include a time delay. For example, the output of receiver 20 is divided into two paths; one connected to a decoupling circuit 30 and the other connected to a time delay network 40. The output of 30 is connected to the lead 14 and the output of time delay network 40 is connected to the lead 15.

The output of the receiver 21 is shown with the opposite orientation of the same functions. Its output is divided between a time delay network 31 and a decoupling circuit 41. The time delay network is connected to the lead 14 and the decoupling circuit is connected to the lead 15.

The receiver 22 is shown with a third variation wherein a time delay network is inserted in both paths of the output of receiver 22, the output of time delay network 32 being connected to lead 14 and the output of time delay network 42 being connected to lead 15.

In operation, electrical waves, or alternating currents of frequencies in the audible range carrying separate information, are applied from the receivers 20—22 through corresponding time delay or decoupling networks to the binaural headphones 12 and 13. The degree of time delay of a given signal as applied to each ear is different for the output of each of the receivers being used. For example, the signal from receiver 20 arrives at earphone 12 ahead of the same signal as it arrives at the earphone 13 after passing through the time delay network 40. This will create the illusion that the signal from receiver 20 is coming from the side of the head in the direction of earphone 12.

In receiver 21 where the time delay is applied to the earphone 12 the sound would appear to come from the side of the head towards earphone 13. Since the degree of time delay is quite critical, the signal—usually sound—may be made to appear to come from anywheres from the extreme left to the extreme right. Consequently, additional receivers or sources of signals may be accommodated, each with corresponding time delay so adjusted that the resultant apparent position of its source is at a different azimuth. That is to say, the sound from one source could appear to come from the extreme left, a sound from another source could appear to come from a point slightly to the left of center, still another sound could appear to come from a source just to the right of center, and a sound from still another source could appear to come from the extreme right.

Fig. 2 shows a variation of the same system wherein the receivers 25 and 26 have outputs divided between time delay networks 35 and 45, and 36 and 46, respectively. The outputs of the time delay networks are again applied to conductors 14 and 15 which connect to earphones 12 and 13, respectively, of the binaural headset 10. The time delay networks here have controls 38 and 48, and 39 and 49, which may continuously vary the time delay. At least one of each pair of these controls may be driven by mechanical means such as motors 55 and 56 so that the sound from a given source reaching the earphones has a continuously varying time difference between the two earphones. This causes the apparent position of the sound to move continuously and suitable adjustment of the mechanical and electrical parts can provide any desired rate of change of the apparent position of the source.

This latter variation of the circuit depends upon the ability of the listener to more readily identify sources of sound that have a predictable motion in space. The mind seems better able to concentrate on the anticipated movement of the source of sound than on a static apparent position where the ear fatigue may possible reduce the ability to concentrate.

Two receivers are shown as sources of alternating current of frequencies in the audible range. Each has separate pairs of time delay networks and separate driving motors so that separate apparent spatial location phenomenon can be produced for each source of signals.

Since the time delay networks commonly used, and applicable here, are presumably of the electronic type, the time delay and the control of the time delay may be accomplished entirely by electronic as well as by mechanical control of electro-mechanical components. If the control of the phase shift is electronic the means for varying it, which in Fig. 2 would be the motors 55 and 56, may also be replaced by electronic circuitry.

The varying phase shift control of Fig. 2 may also be combined with a static phase shift control of Fig. 1 for applying signals to the earphones. The only limitation in the number of channels or receivers that may be used is that of the ability of the listener to identify or concentrate on the apparent position of the signal that he wishes to note at any particular time.

A system such as this would be particularly useful in aircraft communications where the pilot or the crew may be required to monitor more than one source of information at a time. Each source of information may be quite important, although it may operate only intermittently. In standard practice an operator may monitor more than one source of information at a time but he has the problem of identifying the source of information to ascertain its value each time a signal is received and if more than one signal should be received simultaneously the operator may lose all of the information due to the interference and confusion.

With the system taught here, two or three, or even more sources of information may be more effectively monitored simultaneously by a single listener since each signal has a spatial localization that he knows beforehand to help him identify the incoming signal, and should another signal break in concurrently his ability to concentrate on the signal from the first direction—or the second if that is more important—may avoid the loss of intelligence necessary for the navigation and control of the aircraft.

This system also retains all the advantages of the basic concepts for the use of spatial localization for better identification of signals in the presence of relatively high ambient noise level whether the noise is mechanically or electronically produced.

Having thus described my invention, what is claimed is:

1. In a sound reproducing system for simultaneously reproducing the outputs of at least a first source and a second source of audio frequency signals, a binaural headset comprising first and second earphones, a first pair of circuits connecting the output of said first source to said first and second earphones, one of said circuits producing a first amount of signal delay, a second pair of circuits connecting the output of said second source to said first and second earphones, one of said second pair of circuits producing a second amount of signal delay which is greater than said first amount, whereby the signal from said first source appears to a listener to arrive from a different direction than the signal from said second source.

2. In a sound reproducing system for simultaneously translating the outposts of at least a first source and a second source of audio frequency signals, a binaural headset comprising first and second earphones, a pair of circuits for separately applying the output of said first source to said first and second earphones, respectively, said circuits being constructed to produce a given difference in the amount of signal delay produced thereby, a second pair of circuits for separately applying the output of said second source to said first and second earphones, respectively, said second pair of circuits being constructed to provide a difference in the amount of signal delay which is greater than said given difference, whereby the signal from one source appears to arrive from a different direction than the signal from the other source.

3. In a binaural system for receiving a plurality of audible signals, a headset having separately connected left and right earphones, a plurality of receivers, each having an output, each of said receivers having a first means for connecting the output of said receiver to said left earphone, each of said receivers having a second means for connecting the output of said receiver to said right earphone, at least one of said means associated with each of said receivers comprising a time delay network, and means for continuously varying the delay of said time delay network.

4. In a binaural system, a headset having left and right earphones, a first time delay means connected to said right earphone, a first decoupling means connected to said left earphone, a first receiver having an output connected to each of said first means, a second time delay means connected to said left earphone, a second decoupling means connected to said right earphone, a second receiver having an output connected to each of said second means, a third time delay means connected to said left earphone, a fourth time delay means connected to said right earphone, and a third receiver having an output connected to said third and fourth means.

5. In a binaural system, a headset having left and right earphones, a first time delay means having a first variable control connected to said left earphone, a second time delay means having a second variable control connected to said right earphone, a first receiver having an output connected to said first and second time delay means, and driving means connected to said first variable control for continuously varying said first time delay means, a third time delay means having a third variable control connected to said left earphone, a fourth time delay means having a fourth variable control connected to said right earphone, a second receiver having an output connected to said third and fourth time delay means, and driving means connected to said fourth variable control for continuously varying said fourth time delay means.

References Cited in the file of this patent

UNITED STATES PATENTS

| | | |
|---|---|---|
| 2,327,956 | Begun | Aug. 24, 1943 |
| 2,712,596 | Sherman | July 5, 1955 |
| 2,819,342 | Becker | Jan. 7, 1958 |